United States Patent

[11] 3,544,011

| [72] | Inventor | Ary Van der Lely |
| | | 10, Weverskade, Maasland, Netherlands |
| [21] | Appl. No. | 716,393 |
| [22] | Filed | March 27, 1968 |
| [45] | Patented | Dec. 1, 1970 |
| [32] | Priority | April 3, 1967 |
| [33] | | Netherlands |
| [31] | | No. 67,04689 |

[54] DEVICES FOR SPREADING LIQUIDS
3 Claims, 2 Drawing Figs.

| [52] | U.S. Cl. | 239/175, 239/176 |
| [51] | Int. Cl. | B05b 9/00 |
| [50] | Field of Search | 239/146-–176 |

[56] References Cited
UNITED STATES PATENTS

| 502,766 | 8/1893 | Schreick | 239/175 |
| 826,890 | 7/1906 | Schafer | 239/176 |
| 2,978,185 | 4/1961 | Pearch | 239/176 |
| 3,136,485 | 6/1964 | Bellows et al. | 239/172 |

FOREIGN PATENTS

| 1,416,832 | 9/1965 | France | 239/172 |
| 813,512 | 5/1959 | Great Britain | 239/172 |
| 1,084,268 | 9/1967 | Great Britain | 239/172 |

*Primary Examiner*—Lloyd L. King
*Attorney*—Mason, Mason and Albright

ABSTRACT: A spreader for liquids has a container, an outlet and a spreading member at the end of the outlet to form a conduit for the liquid being spread. The spreading member is mounted to be pivotable relative to the outlet so that the spreading member can be swung away from the outlet.

Patented Dec. 1, 1970
3,544,011
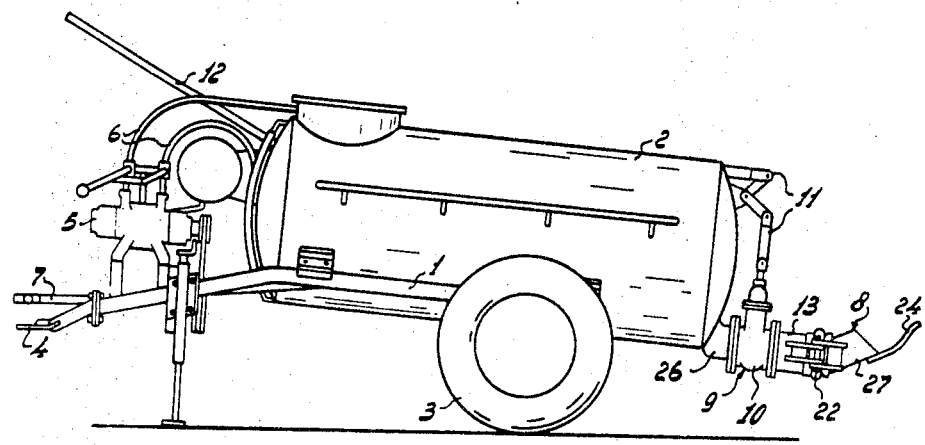
FIG. 1
FIG. 2
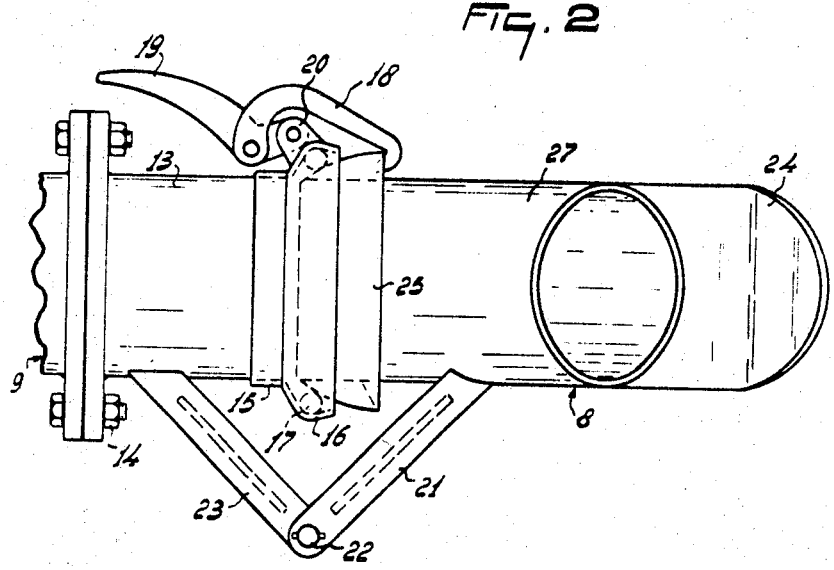
INVENTOR
ARY VAN DER LELY
BY
Mason, Mason & Albright
Attorneys

DEVICES FOR SPREADING LIQUIDS

This invention relates to devices for spreading liquids.

According to the present invention there is provided a device for spreading liquids comprising a container for the liquid to be spread and a spreading member connected to an outlet of the container for distributing liquid from the container, the spreading member being pivotable on the device relative to the outlet of the container.

For a better understanding of the invention and to show how the same may be carried into effect reference will now be made, by way of example, to the accompanying drawing, in which:

FIG. 1 is a side view of a device for spreading liquids, and

FIG. 2 is a plan view, on an enlarged scale, of part of an outlet, and of a spreading member, of the device of FIG. 1.

The device for spreading liquids shown in the FIGS. has a frame 1 on which a cylindrical liquid container 2 is mounted. The frame 1 has two ground wheels 3, one of which is shown in FIG. 1. The device is intended to be towed by a vehicle, for example, a tractor and to this end the front (with respect to the intended direction of operative travel) of the frame 1 is provided with a drawbar 4 by which the device can be attached to a vehicle for propelling the device. A telescopic leg is provided for supporting the front end of the device when not attached to a vehicle.

Also at the front a pump 5 is mounted on the frame 1. This pump 5 communicates through ducts 6 with the container 2 and is connected to be driven by a shaft 7 which can be coupled, in operation, with the power takeoff shaft of the tractor propelling the device. At the rear of the liquid container 2 the spreading member 8 shown on large scale in FIG. 2 is joined to the outlet 9 also shown on large scale in FIG. 2. The outlet 9 includes an exhaust member 26 which is disposed near the bottom of the container 2 on the rear wall thereof.

The exhaust member 26 is provided with a closing member 10 which is linked by a rod system 11 to a control-arm 12 that extends from the front of the device so that it can be operated by the tractor driver. The closing member 10 carries a supporting pipe 13 which is secured by bolts 14 to the closing member 10 and which has a diameter of 6 inches. The supporting pipe 13 has a ring 15 at its free end, the ring 15 having a bent-over portion 16 in which a stuffing ring 17 is disposed. The ring 15 further carries a clamp 18 which is pivoted to a control-arm 19 which is pivoted, in turn, to a support 20 extending from the ring 15.

The spreading member 8 is formed by a spray nozzle 27 of a diameter of 6 inches, provided with arms 21. The arms 21 are hinged by means of a pivotal shaft 22 to supporting arms 23 that are fixed to the supporting pipe 13 so that they are located on the same side of the closing member 10 as the spreading member 8. The shaft 22 is on the side of the longitudinal axis of the outlet 9 remote from the clamp 18. Near the end of the spray nozzle 27 there is a distributing plate 24.

During operation of the device, while liquid is being distributed from the container 2, the spray nozzle 27 occupies the position shown in the FIGS. In operation air is pumped by the pump 5 into the container 2 so that the liquid is sprayed from the nozzle 27 under pressure, providing the closing member 10 is open. The liquid is sprayed by the spray nozzle 27 against the distributing plate 24, so that it is spread over a wide range during the travel of the device. This device is therefore particularly suitable for spreading thick liquids such as liquid manure.

The spray nozzle 27 can be cleaned by pivoting the control-arm 19 so that the clamp 18 can be pivoted away from behind the ring 25. After the clamp 18 has been pivoted clear of the ring 25, the spreading member 8 can be pivoted about the pivot formed by the shaft 22. The spray nozzle 27 and the supporting pipe 13 can then be cleaned. The spreading member 8 can be readily pivoted since, during pivoting about the shaft 22, the spray nozzle 27 need be displaced only in a horizontal direction, the shaft 22 extending vertically. Conversely, the spray nozzle 27 can be quickly clamped tight on the ring 15 by means of the fixing member formed by the arms 19 and the clamp 18.

After removal of the spray nozzle 27, a suction hose may, if desired, be coupled with the supporting pipe 13 for filling the container 2. By withdrawing air from the container by means of the pump 5 the liquid to be spread can be drawn into the container 2. The ring 15 may, if necessary, be provided with further fixing members for securing the suction hose, for example, a second clamping hook similar to that formed by the clamp 18, for fastening the suction hose to the pipe 13. Such a second clamping hook can also serve, in conjunction with the clamp 18, for securing the spray nozzle 27 to the pipe 13.

I claim:

1. A device for spreading liquids comprising a container with an outlet for the liquid to be spread, a spreading member connectable with said outlet for distributing liquid from said container through said spreading member, said spreading member comprising a conduit with a spray nozzle and an arm affixed to said nozzle, said arm being hingeably connected about a substantially vertical axis to a further supporting arm fastened to said outlet whereby said nozzle can be pivoted in and out of engagement with said outlet about said axis, said outlet having a connecting ring and a fixing mechanism whereby said conduit can be received in said outlet pipe, said fixing mechanism comprising clamp means located on the side of the longitudinal axis of said outlet pipe remote from the pivotal connection between said arm and said supporting arm.

2. A device as claimed in claim 1, wherein said outlet has a closing member for releaseably securing said outlet to said conduit during spreading operation, said clamp means including a gripping element on said spreading member for cooperating with said closing member whereby said spreading member and said outlet can be affixed to one another and said conduit extends in the same direction as said outlet.

3. A device as claimed in claim 2, wherein said outlet is comprised by a pipe connected to said container and said closing member is connected to said pipe.